(12) United States Patent
Bao

(10) Patent No.: US 10,270,895 B2
(45) Date of Patent: Apr. 23, 2019

(54) TERMINAL HOUSING AND MOBILE TERMINAL

(71) Applicant: GUANGDONG OPPO MOBILE TELECOMMUNICATIONS CORP., LTD., Dongguan (CN)

(72) Inventor: Xiaoming Bao, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/677,591

(22) Filed: Aug. 15, 2017

(65) Prior Publication Data

US 2018/0176348 A1 Jun. 21, 2018

(30) Foreign Application Priority Data

Dec. 15, 2016 (CN) .................... 2016 2 1376763 U

(51) Int. Cl.
*H04M 1/00* (2006.01)
*H04M 1/02* (2006.01)
*H04B 1/3827* (2015.01)

(52) U.S. Cl.
CPC ........ *H04M 1/0249* (2013.01); *H04B 1/3827* (2013.01)

(58) Field of Classification Search
CPC ............................ H04M 1/0249; H04B 1/3827
USPC ............................................ 455/575.1, 575.3
See application file for complete search history.

(56) References Cited

U.S. PATENT DOCUMENTS

| 8,509,864 | B1 * | 8/2013 | Diebel | G03B 17/02 |
| | | | | 455/575.8 |
| 2012/0157173 | A1 * | 6/2012 | Kim | G06F 1/1626 |
| | | | | 455/575.4 |
| 2013/0318766 | A1 * | 12/2013 | Kiple | B23P 11/00 |
| | | | | 29/428 |
| 2015/0331451 | A1 * | 11/2015 | Shin | G06F 3/041 |
| | | | | 345/173 |
| 2016/0147264 | A1 * | 5/2016 | Kil | G06F 1/1626 |
| | | | | 345/173 |
| 2017/0006143 | A1 * | 1/2017 | Yang | H04M 1/0249 |
| 2017/0033824 | A1 * | 2/2017 | Tien | H04B 1/3888 |
| 2017/0070254 | A1 * | 3/2017 | Lee | G06F 1/1626 |

(Continued)

FOREIGN PATENT DOCUMENTS

CN 105576379 A 5/2016
CN 105870600 A 8/2016
(Continued)

OTHER PUBLICATIONS

PCT/CN2017/099637 English translation of the International Search Report and Written Opinion dated Nov. 3, 2017, 11 pages.

*Primary Examiner* — Md K Talunkder
(74) *Attorney, Agent, or Firm* — Lathrop Gage LLP

(57) ABSTRACT

A terminal housing includes an intermediate piece, two end pieces located at two opposite sides of the intermediate piece respectively, and two insulators each connected between the intermediate piece and one of the two end pieces. Each of the two end pieces has a mounting portion corresponding to the insulator and provided with an engagement structure. The engagement structure is engaged with the insulator and is uneven. A mobile terminal having the terminal housing is also provided.

16 Claims, 4 Drawing Sheets

(56) References Cited

U.S. PATENT DOCUMENTS

| | | | | |
|---|---|---|---|---|
| 2017/0339482 A1* | 11/2017 | Schrems | ............... | G06F 1/1626 |
| 2017/0373376 A1* | 12/2017 | Jo | ........................... | H01Q 1/243 |
| 2018/0175483 A1* | 6/2018 | Bao | ........................ | H01Q 1/243 |
| 2018/0176348 A1* | 6/2018 | Bao | ....................... | H04B 1/3827 |
| 2018/0241430 A1* | 8/2018 | Youn | ................... | H04M 1/0249 |
| 2018/0261921 A1* | 9/2018 | Ha | .......................... | H04M 1/02 |

FOREIGN PATENT DOCUMENTS

| | | |
|---|---|---|
| CN | 106231013 A | 12/2016 |
| CN | 206259983 U | 6/2017 |
| WO | WO 2015136886 A1 | 9/2015 |

* cited by examiner

US 10,270,895 B2

TERMINAL HOUSING AND MOBILE TERMINAL

CROSS-REFERENCE TO RELATED APPLICATION

This application claims priority to and benefits of Chinese Patent Application Serial No. 201621376763.7, filed with the State Intellectual Property Office of P. R. China on Dec. 15, 2016, the entire content of which is incorporated herein by reference.

FIELD

The present disclosure relates to electronic equipments, in particular to a terminal housing and a mobile terminal including the terminal housing.

BACKGROUND

With the popularity of mobile terminals, such as smart phones, and the improvement of metal housing manufacturing process, a metal housing is employed in more and more mobile phones and makes the smart phone more advanced due to its high heat dissipation capacity, high mechanic strength (enabling the metal housing to be thinned so as to meet the need of consumers for ultra-thin equipment), unique metallic luster and fashion appearance. As the metal housing may produce electrostatic shielding effect which affects the emission and reception of radio frequency, the metal housing is generally designed in a three-section manner, in which an intermediate piece and two end pieces of the metal housing is spaced apart by providing a groove therebetween, and connected into an integral housing by a plastic injected into the groove and molded therein. In this way, the end piece of the metal housing is connected to the PCB plate of the antenna via a conductor, such that the end piece possesses a signal radiation function and becomes a part of the antenna.

However, in order to improve the integrity of the metal housing, a width of the end piece of the metal housing narrows down. In such a case, the plastic is easily detached from the end piece when the phone falls or is under external shocks, resulting in damage of the metal housing.

SUMMARY

Therefore, it is necessary to provide a terminal housing with improved impact resistance as well as a mobile terminal having the same.

In an embodiment of a first aspect of the present disclosure, a terminal housing is provided. The terminal housing includes an intermediate piece, two end pieces and two insulators. The two end pieces are located at two opposite sides of the intermediate piece, respectively. The two insulators each are connected between the intermediate piece and one of the two end pieces. Each of the two end pieces has a mounting portion corresponding to the insulator and provided with an engagement structure, and the engagement structure is engaged with the insulator and is uneven.

In an embodiment of a second aspect of the present disclosure, a mobile terminal is provided. The mobile terminal includes a terminal housing. The terminal housing includes an intermediate piece, two end pieces and two insulators. The two end pieces are disposed at two opposite sides of the intermediate piece respectively. The two insulators each are disposed between the intermediate piece and one of the two end pieces. Each of the two end pieces is provided with a mounting portion corresponding to the insulator. The mounting portion is provided with an uneven engagement structure engaged with the insulator.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings as described below.

DETAILED DESCRIPTION

Figure 1:
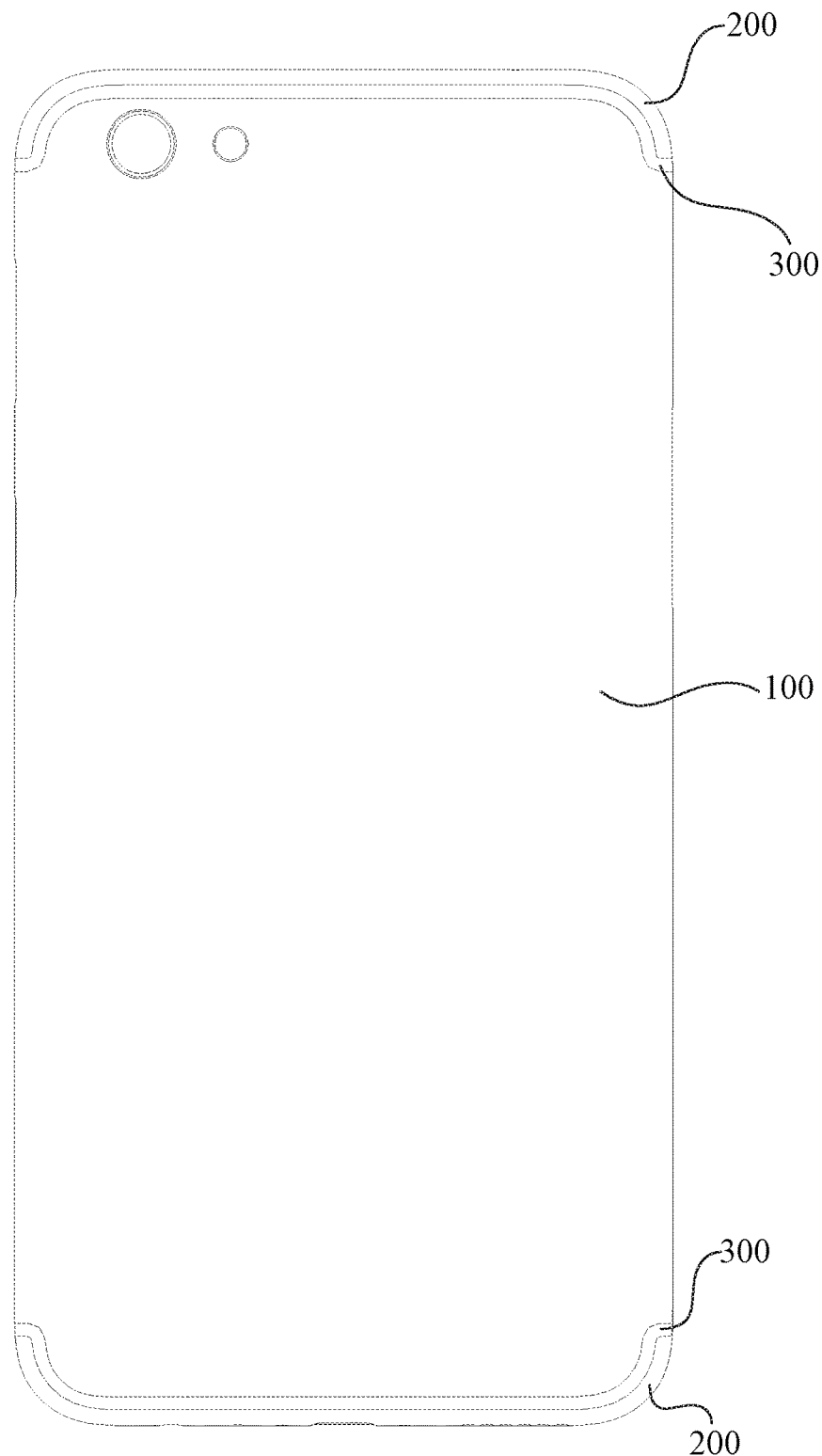
FIG. 1 is a schematic front view of a housing according to an embodiment of the present disclosure.

Reference will be made in detail to embodiments of the present disclosure. The embodiments described herein with reference to drawings are explanatory, illustrative, used to generally and comprehensively understand the present disclosure, and shall not be construed to limit the present disclosure.

It is to be understood that, in the present disclosure, unless specified or limited otherwise, the terms "connected" and "fixed" and the like are used broadly, and may be, for example, direct connections or indirect connections via intervening structures, which can be understood by those skilled in the art according to specific situations. Terms such as "inside," "outside," "left," and "right," should be construed to refer to the orientation as then described or as shown in the drawings under discussion. These relative terms are for convenience of description and do not require that the present disclosure be constructed or operated in a particular orientation.

In an embodiment of the present disclosure, a terminal housing includes an intermediate piece, two end pieces and two insulators. The two end pieces are located at two opposite sides of the intermediate piece respectively. The two insulators each are connected between the intermediate piece and one of the two end pieces. Each of the two end pieces has a mounting portion corresponding to the insulator and provided with an engagement structure, and the engagement structure is engaged with the insulator and is uneven.

In an embodiment of the present disclosure, the engagement structure includes a groove construction formed in the end piece, a depth direction of the groove construction being parallel to a plane in which the intermediate piece is located.

In an embodiment of the present disclosure, the groove construction includes a groove extending in a length direction of the end piece, or a groove extending in a height direction of the end piece or a combination thereof.

In an embodiment of the present disclosure, the groove construction includes a plurality of grooves spaced apart from each other and extending in a length direction or a height direction of the end piece.

In an embodiment of the present disclosure, a cross-section of the groove is rectangular or isosceles trapezoid.

In an embodiment of the present disclosure, the engagement structure further includes a boss provided on the mounting portion and projecting in a width direction of the end piece, and a plurality of counterbores formed in the boss, spaced apart from each other and extending in a height direction of the end piece.

In an embodiment of the present disclosure, a cross-section of the counterbore is semicircular, rectangular or triangular.

In an embodiment of the present disclosure, a distance from the groove to the intermediate piece is greater than a distance from the boss to the intermediate piece.

In an embodiment of the present disclosure, the engagement structure further includes a boss provided on the mounting portion and projecting in a width direction of the end piece, and a sunk slot formed in the boss and extending in a length direction of the end piece, a depth direction of the sunk slot being perpendicular to the plane in which the intermediate piece is located.

In an embodiment of the present disclosure, the insulator is made of plastic.

In an embodiment of the present disclosure, a mobile terminal includes a terminal housing. The terminal housing includes an intermediate piece, two end pieces and two insulators. The two end pieces are disposed at two opposite sides of the intermediate piece respectively. The two insulators each are disposed between the intermediate piece and one of the two end pieces. Each of the two end pieces is provided with a mounting portion corresponding to the insulator. The mounting portion is provided with an uneven engagement structure engaged with the insulator.

Figure 2:
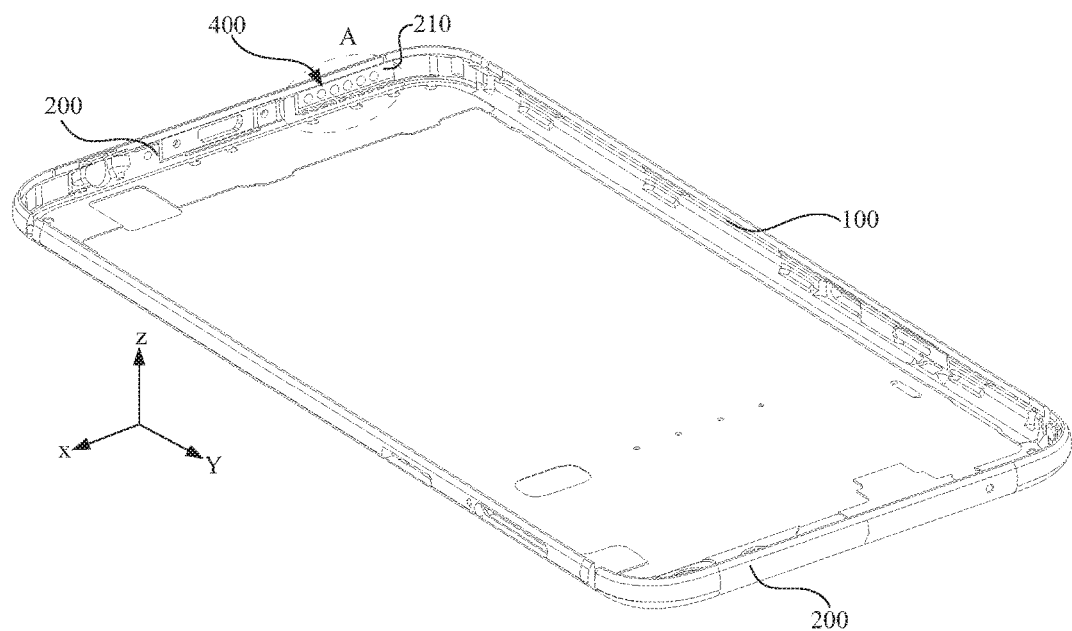
FIG. 2 is a schematic perspective view of a housing according to an embodiment of the present disclosure.

Referring to FIG. 1 and FIG. 2, a terminal housing, provided on a mobile terminal such as a mobile phone, includes an intermediate piece 100, two end pieces 200 and two insulators 300. The two end pieces 200 are located at two opposite sides of the intermediate piece 100, respectively. Each insulator 300 is located between the intermediate piece 100 and one of the two end pieces 200. The intermediate piece 100 and the end pieces 200 are joined together into an integral housing by the connection of the insulators 300. In practice, the entire housing is no longer a conductor of which parts are not electrically communicated with each other due to the division of the insulators 300. Therefore, the housing cannot induce an electrostatic shielding effect, while the two end pieces 200 have a signal radiation function and become a part of the mobile phone antenna.

The end piece 200 is provided with a mounting portion 210. The mounting portion 210 is corresponding to the insulator 300 and provided with an uneven engagement structure 400. In at least one embodiment, the engagement structure 400 can be a concave-convex structure. The engagement structure 400 increases the bonding area between the insulator 300 and the mounting portion 210. When the insulator 300 is engaged with the engagement structure 400, an occlusal structure is formed which enhances the bonding strength between the insulator 300 and the end piece 200. Detachment of the insulator 300 from the end piece 200 is not liable to occur under an external shock, thereby ensuring that the entire housing has a strong impact resistance.

Figure 3:
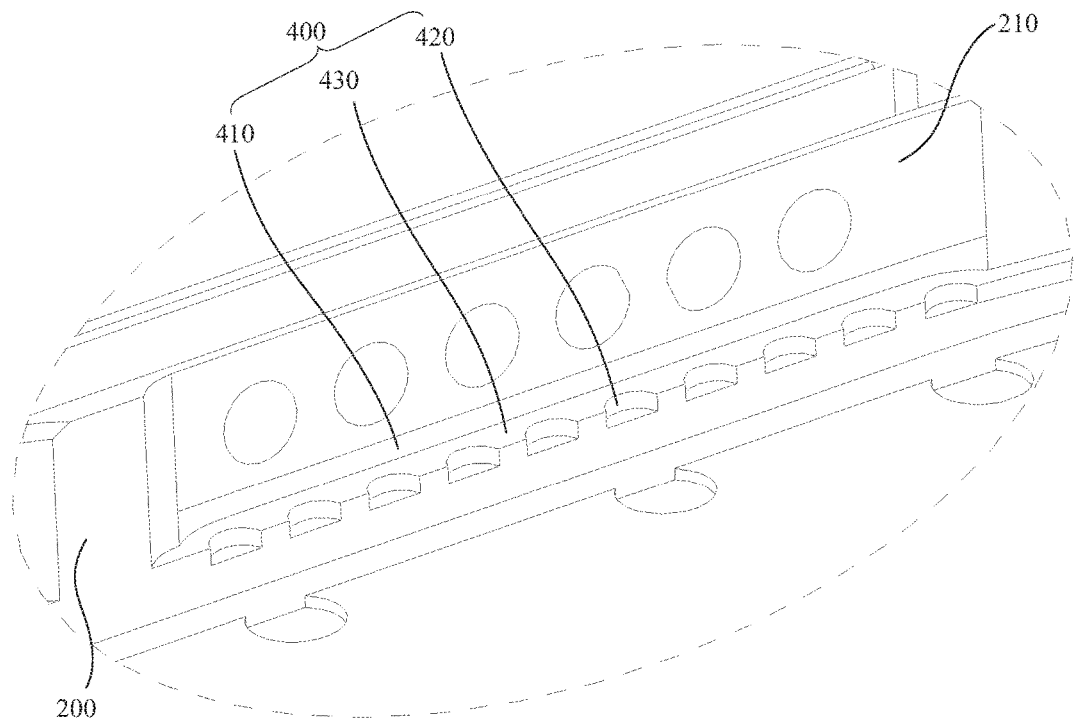
FIG. 3 is a schematic enlarged view of part A in FIG. 2 according to an embodiment of the present disclosure.

Referring to FIG. 2 and FIG. 3, the engagement structure 400 includes a groove construction. The groove construction includes a plurality of grooves 410 which are formed in an inner wall of the mounting portion 210 and extends in a length direction (X-axis direction) of the end piece 200. A depth direction (Y-axis direction) of the groove 410 is parallel to a plane in which the intermediate piece 100 is located, and certainly is perpendicular to the inner wall surface of the mounting portion 210. A depth of the groove 410 may be about one-third of a thickness of the mounting portion 210. In brief, the groove 410 is transversely formed (in the X-axis direction). The plurality of grooves 410 are parallel to each other. Due to the restriction of the structure of the mounting portion 210, when the number of the grooves 410 is increased, its width is correspondingly reduced; when the number of the grooves 410 is reduced, its width correspondingly becomes larger. When the transversely formed groove 410 is fitted with the insulator 300, the housing is well resistant to the impact force in a longitudinal direction (Z-axis direction).

Figure 5:
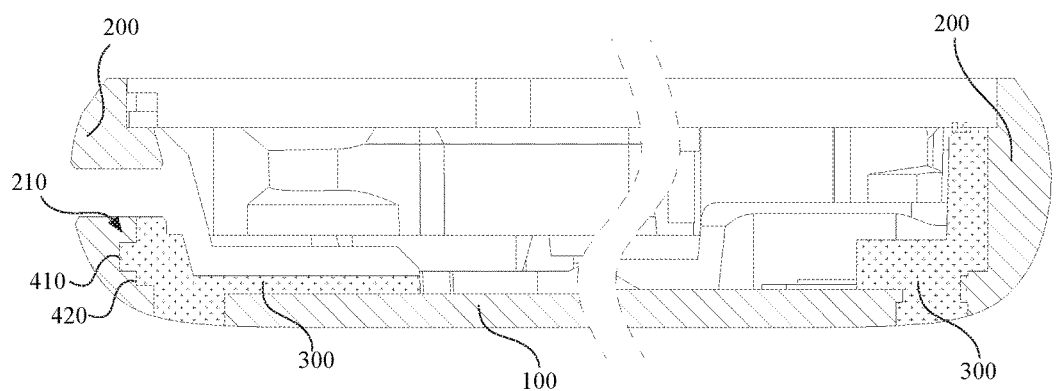
FIG. 5 is a schematic cross-sectional view of a housing according to an embodiment of the present disclosure.
Figure 6:
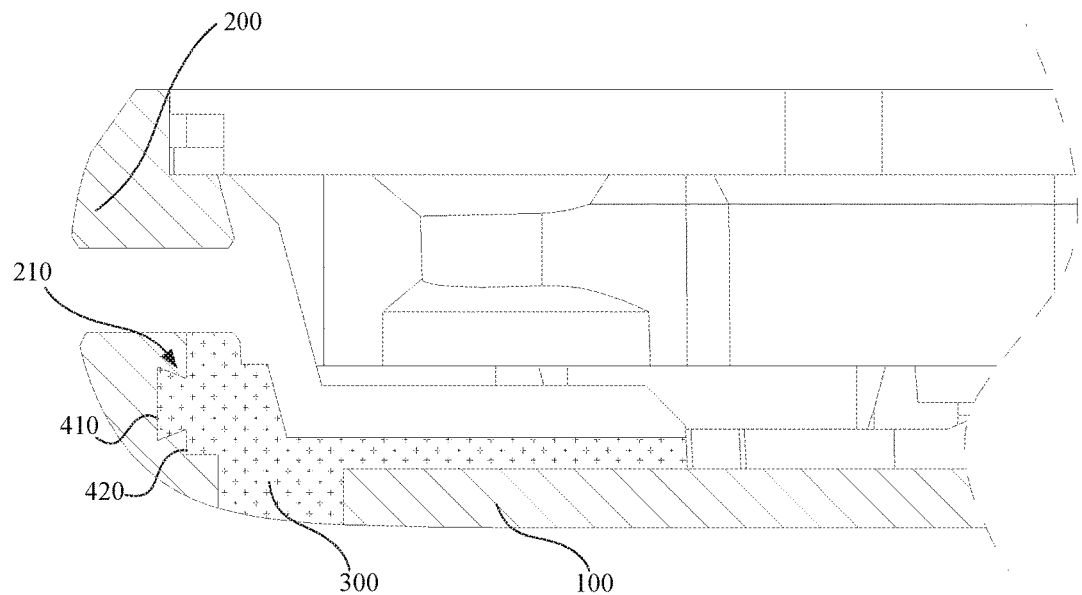
FIG. 6 is a schematic cross-sectional view of a housing according to another embodiment of the present disclosure.

Referring to FIG. 3, FIG. 5 and FIG. 6, in an embodiment, the groove construction includes one groove 410 extending in the length direction (X-axis direction) of the end piece 200, i.e. the number of the transversely formed grooves 410 is one. In an embodiment, a cross-section of the groove 410 is rectangular, and of course may also be isosceles trapezoid (i.e. dovetail groove) or triangular (i.e. V-shaped groove). The groove 410 is processed and sharped by milling with a T-shaped milling cutter.

Figure 4:
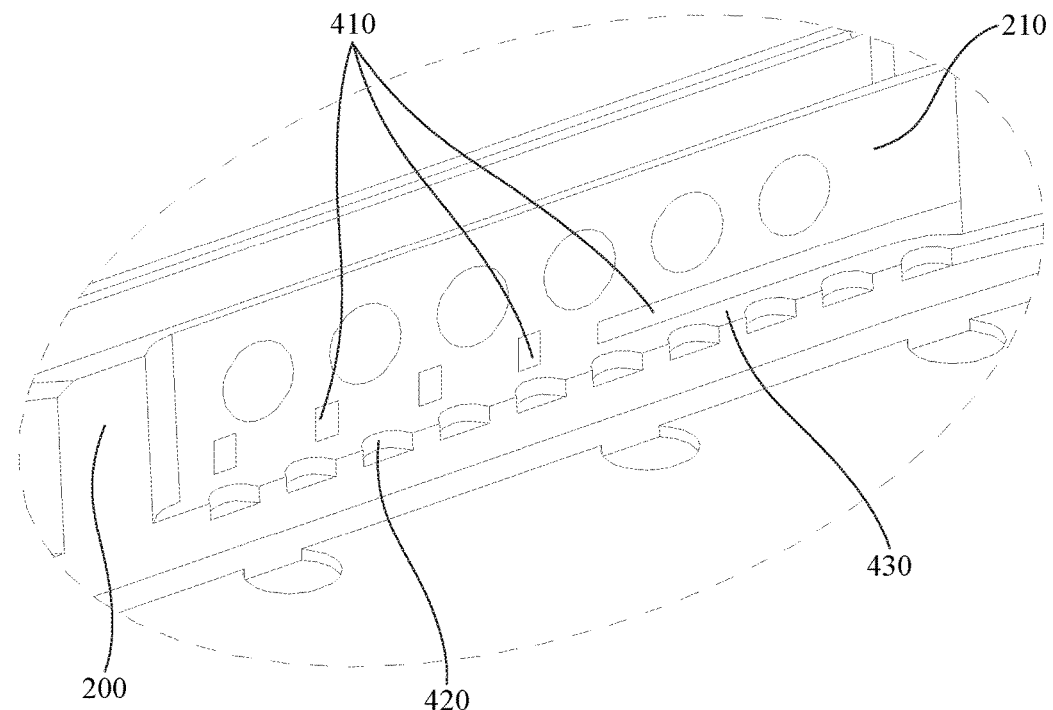
FIG. 4 is a schematic enlarged view of part A in FIG. 2 according to another embodiment of the present disclosure.

Referring to FIGS. 2 and 4, it will be understood that the groove construction may include a groove 410 extending in a height direction (Z-axis direction) of the end piece 200. Likewise, the depth direction of the groove 410 is parallel to the plane where the intermediate piece 100 is located and perpendicular to the inner wall surface of the mounting portion 210, that is, the groove 410 is a vertically formed groove 410 (in the Z-axis direction). In an embodiment, the groove construction may include a plurality of vertically formed grooves 410 which are spaced apart from each other and distributed in the inner wall of the mounting portion 210. When the vertically formed grooves 410 are fitted with the insulator 300, the housing is well resistant to the impact force in a transverse direction.

Referring to FIG. 2 and FIG. 4, in other alternative embodiments, for example, the mounting portion 210 is provided at the same height with the transversely formed groove(s) 410 in a part of the inner wall of the mounting portion 210 and the vertically formed groove(s) 410 in the other part of the inner wall of the mounting portion 210. The two forms of the grooves 410 are arranged in a staggered manner and also serve to enhance the bonding strength between the insulator 300 and the end piece 200.

Referring to FIG. 2 and FIG. 3, the engagement structure 400 further includes a boss 430 and a plurality of counterbores 420. The boss 430 is provided on the mounting portion 210 and is projected in a width direction (Y-axis direction) of the end piece 200. That is, the boss 430 is protruded with respect to the inner wall surface where the groove 410 is located. The plurality of counterbores 420 are formed in the boss 430, spaced apart from each other, and extend in the height direction of the end piece 200. A center axis of the counterbore 420 is perpendicular to the intermediate piece 100. That is, the counterbore 420 is a vertical bore.

The counterbore 420 has a notch, i.e., a sidewall surface defining the counterbore 420 forms an open loop rather than a closed loop structure. The counterbore 420 can be formed by milling a part of the material of the boss 430 (i.e., digging a part of the material on a side of the boss 430) with a milling cutter. Of course, the counterbore 420 may be a completely closed hole, i.e., the sidewall surface defining the counterbore 420 forms an open loop structure.

A cross-section of the counterbore 420 is semicircular, rectangular or triangular, and of course may have other arcuate or polygonal shapes. When the insulator 300 is fitted with the counterbore 420, the housing is well resistant to the impact force in all directions in a horizontal plane.

Figure 7:
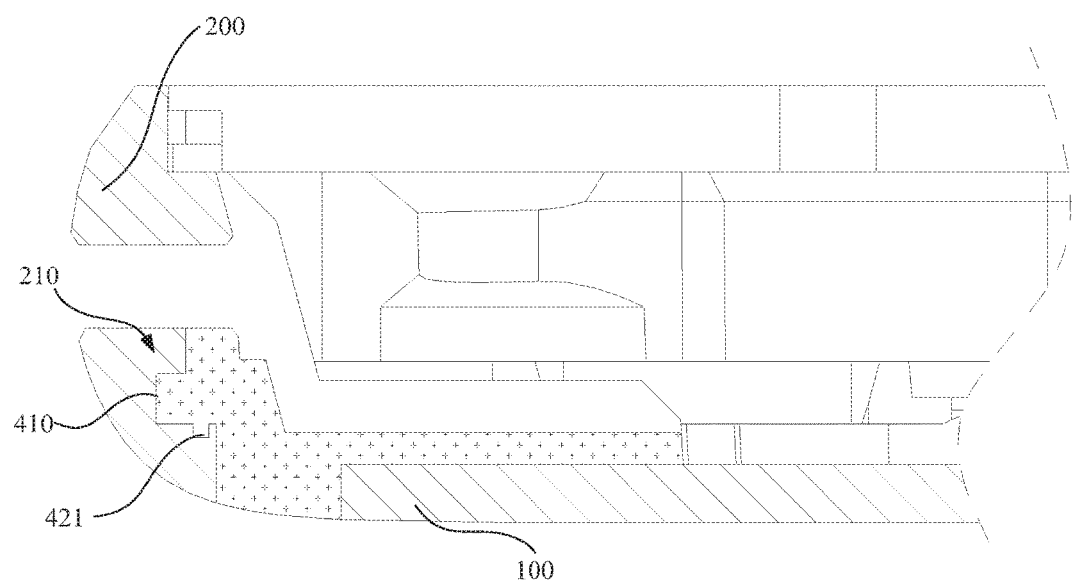
FIG. 7 is a schematic cross-sectional view of a housing according to yet another embodiment of the present disclosure.

Referring to FIG. 2 and FIG. 7, it will be appreciated that a sunk slot 421 may also be formed in the boss 430. The sunk slot 421 extends in the length direction of the end piece 200. A depth direction (Z-axis direction) of the sunk slot 421 is perpendicular to the plane in which the intermediate piece 100 is located, i.e., the sunk slot 421 is a transversely formed slot.

Further, a distance from the groove 410 to the intermediate piece 100 is greater than a distance from the boss 430 to the intermediate piece 100, that is, the boss 430 is located below the groove 410. Of course, the boss 430 may also be located above the groove 410.

During the processing, the molten plastic is injected from the gap between the intermediate piece 100 and the end piece 200 into the groove 410 and the counterbore 420 by an injection molding method, and forms the above insulator 300 after solidified. The plastic may be a PPS (polyphenylene sulfide) plastic or a PBT (polybutylene terephthalate) plastic. Bonding force between the molded insulator 300 and the end piece 200 is generated not only in a limited plane therebetween, but in an additional force area formed by the fitting of the groove 410 and the counterbore 420 with the insulator 300. Besides, structures of the groove 410 and the counterbore 420 as well as the arrangement and distribution of the groove 410 and the counterbore 420 in different forms enable the insulator 300 to withstand the impact from the external forces in different directions and not to easily detach from the end piece 200 to ensure the drop and impact resistance of the housing.

To further improve the impact resistance of the housing and the mobile terminal, the intermediate piece 100 may also be provide with a groove 410 or counterbore 420 to increase the bonding strength between the insulator 300 and the intermediate piece 100.

The technical features of the above-described embodiments can be arbitrarily combined. In order to make the description brief, not all possible combinations of the respective technical features in the above-described embodiments are described. As long as there is no contradiction in the combination of these technical features, it should be considered within the scope of present disclosure.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure. Therefore, the scope of the present disclosure should be subject to the appended claims.

What is claimed is:

1. A terminal housing, comprising:
   an intermediate piece,
   two end pieces located at two opposite sides of the intermediate piece respectively, each of the two end pieces including a respective groove defined in an inner wall surface thereof and extending into the end piece in a depth direction, and
   two insulators, each insulator being connected between the intermediate piece and a respective one of the two end pieces in the depth direction, wherein each insulator extends into the groove of its respective one of the two end pieces in the depth direction to secure the insulator to the end piece,
   wherein the respective groove of each end piece comprises a combination of a groove extending in a length direction of the end piece and a groove extending in a height direction of the end piece at the same height of the end piece.

2. The terminal housing according to claim 1, wherein the respective groove of each end piece comprises, at the same height of the end piece, a plurality of grooves spaced apart from each other and extending in the length direction and a plurality of grooves spaced apart from each other and extending in the height direction of the end piece.

3. The terminal housing according to claim 1, wherein a cross-section of the respective groove of each end piece is rectangular or isosceles trapezoid.

4. The terminal housing according to claim 1, wherein each end piece further includes:
   a boss projecting in a width direction of the end piece, and
   a plurality of counterbores formed in the boss, spaced apart from each other and extending in a height direction of the end piece.

5. The terminal housing according to claim 4, wherein a cross-section of each counterbore is semicircular, rectangular or triangular.

6. The terminal housing according to claim 4, wherein in each end piece, a distance from the groove to the intermediate piece is greater than a distance from the boss to the intermediate piece.

7. The terminal housing according to claim 1, wherein each end piece further includes:
   a boss projecting in a width direction of the end piece, and
   a sunk slot formed in the boss and extending in a length direction of the end piece, a depth direction of the sunk slot being perpendicular to the plane in which the intermediate piece is located.

8. The terminal housing according to claim 1, wherein the insulator is made of plastic.

9. A mobile terminal, comprising a terminal housing, wherein the terminal housing comprises:
   an intermediate piece,
   two end pieces disposed at two opposite sides of the intermediate piece respectively, each of the two end pieces including a respective groove defined in an inner wall surface thereof and extending into the end piece in a depth direction, and
   two insulators, each insulator being disposed between the intermediate piece and a respective one of the two end pieces in the depth direction, wherein each insulator extends into the groove of its respective one of the two end pieces in the depth direction to secure the insulator to the end piece,
   wherein the respective groove of each end piece comprises a combination of a groove extending in a length direction of the end piece and a groove extending in a height direction of the end piece at the same height of the end piece.

10. The mobile terminal according to claim 9, wherein the respective groove of each end piece comprises, at the same height of the end piece, a plurality of grooves spaced apart from each other and extending in the length direction and a plurality of grooves spaced apart from each other and extending in the height direction of the end piece.

11. The mobile terminal according to claim 9, wherein a cross-section of the respective groove of each end piece is rectangular or isosceles trapezoid.

12. The mobile terminal according to claim 9, wherein each end piece further comprises:
   a boss projecting in a width direction of the end piece, and
   a plurality of counterbores formed in the boss, spaced apart from each other and extending in a height direction of the end piece.

13. The mobile terminal according to claim 12, wherein a cross-section of each counterbore is semicircular, rectangular or triangular.

14. The mobile terminal according to claim 12, wherein in each end piece, a distance between the groove and the intermediate piece is greater than that between the boss and the intermediate piece.

15. The mobile terminal according to claim 9, wherein each end piece further includes:
   a boss disposed projecting in a width direction of the end piece, and
   a sunk slot formed in the boss and extending in a length direction of the end piece, a depth direction of the sunk slot being perpendicular to the plane where the intermediate piece is located.

16. The mobile terminal according to claim 9, wherein the insulator is made of plastic.

* * * * *